(12) United States Patent
Buzaski et al.

(10) Patent No.: US 9,448,784 B2
(45) Date of Patent: Sep. 20, 2016

(54) REDUCING DOWNTIME DURING UPGRADES OF INTERRELATED COMPONENTS IN A DATABASE SYSTEM

(71) Applicant: Oracle International Corporation, Redwood Shores, CA (US)

(72) Inventors: George Buzaski, Fremont, CA (US); Kevin Hudson, San Francisco, CA (US); Ivo Dujmovic, Redwood City, CA (US); Sandeep Kadiyala, Andhra Pradesh (IN); Venu Palakurthy, Andhra Pradesh (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 200 days.

(21) Appl. No.: 13/802,791

(22) Filed: Mar. 14, 2013

(65) Prior Publication Data

US 2014/0101646 A1 Apr. 10, 2014

Related U.S. Application Data

(60) Provisional application No. 61/707,823, filed on Sep. 28, 2012, provisional application No. 61/707,827, filed on Sep. 28, 2012, provisional application No. 61/707,840, filed on Sep. 28, 2012.

(51) Int. Cl.
*G06F 9/44* (2006.01)
*G06F 7/00* (2006.01)
(Continued)

(52) U.S. Cl.
CPC . *G06F 8/65* (2013.01); *G06F 8/67* (2013.01); *G06F 8/68* (2013.01); *G06F 8/71* (2013.01); *G06F 11/2056* (2013.01); *G06F 11/2058* (2013.01); *G06F 17/30002* (2013.01);
(Continued)

(58) Field of Classification Search
None
See application file for complete search history.

(56) References Cited

U.S. PATENT DOCUMENTS 5,227,967 A 7/1993 Bailey
5,315,709 A 5/1994 Alston et al.
(Continued)

OTHER PUBLICATIONS

Alan Choi, "Online Application Upgrade Using Edition-Based Redefinition", 2009 ACM.*
(Continued)

*Primary Examiner* — Lewis A Bullock, Jr.
*Assistant Examiner* — Mark Gooray
(74) *Attorney, Agent, or Firm* — Vista IP Law Group, LLP; Peter C. Mei

(57) ABSTRACT

A method, system, and computer program product for reducing downtime during upgrades of interrelated components in a computing environment. The method commences while at least one running software application is executing within the computing environment by loading a plurality of database objects from an initial run edition into a patch edition. The database objects comprise at least one software application code module, at least one relational database table, and at least one file system. The method continues by applying at least one patch to the software application code module(s) corresponding to the running software application(s) to create patched software application(s), then applying patches to the relational database table to create a patched relational database table, and further applying a patch to the file system to create a patched file system. When the subject patches have been applied, the method stops the running software application(s) and starts the patched software application(s).

20 Claims, 12 Drawing Sheets

(51) Int. Cl.
  *G06F 17/00*   (2006.01)
  *G06F 9/445*   (2006.01)
  *G06F 17/30*   (2006.01)
  *G06F 11/20*   (2006.01)

(52) U.S. Cl.
  CPC ... *G06F17/30174* (2013.01); *G06F 17/30374* (2013.01); *G06F 17/30383* (2013.01); *G06F 17/30424* (2013.01); *G06F 17/30595* (2013.01)

(56) References Cited

U.S. PATENT DOCUMENTS

| | | | |
|---|---|---|---|
| 5,440,743 | A | 8/1995 | Yokota et al. |
| 5,448,727 | A | 9/1995 | Annevelink |
| 5,555,388 | A | 9/1996 | Shaughnessy |
| 5,608,903 | A | 3/1997 | Prasad et al. |
| 5,640,550 | A | 6/1997 | Coker |
| 5,717,924 | A | 2/1998 | Kawai |
| 5,978,426 | A | 11/1999 | Glover et al. |
| 6,016,497 | A | 1/2000 | Suver |
| 6,122,630 | A | 9/2000 | Strickler et al. |
| 6,122,640 | A | 9/2000 | Pereira |
| 6,138,112 | A | 10/2000 | Slutz |
| 6,173,313 | B1 | 1/2001 | Klots et al. |
| 6,268,850 | B1 | 7/2001 | Ng |
| 6,304,867 | B1 | 10/2001 | Schmidt |
| 6,314,535 | B1 | 11/2001 | Morris et al. |
| 6,324,535 | B1 | 11/2001 | Bair et al. |
| 6,363,387 | B1 | 3/2002 | Ponnekanti et al. |
| 6,460,055 | B1 | 10/2002 | Midgley et al. |
| 6,480,848 | B1 | 11/2002 | DeKimpe et al. |
| 6,519,613 | B1 | 2/2003 | Friske et al. |
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1 | 7/2004 | Schoening et al. |
| 6,801,983 | B2 | 10/2004 | Abe et al. |
| 6,834,290 | B1 | 12/2004 | Pugh et al. |
| 6,965,899 | B1 | 11/2005 | Subramaniam et al. |
| 7,028,057 | B1 | 4/2006 | Vasudevan et al. |
| 7,080,371 | B1 | 7/2006 | Arnaiz et al. |
| 7,237,238 | B2 | 6/2007 | Peppers |
| 7,310,653 | B2 | 12/2007 | Coyle et al. |
| 7,350,191 | B1 | 3/2008 | Kompella et al. |
| 7,421,458 | B1 | 9/2008 | Taylor et al. |
| 7,574,461 | B1 | 8/2009 | Armorer et al. |
| 7,603,669 | B2 | 10/2009 | Curtis et al. |
| 7,689,587 | B1 | 3/2010 | Tiruveedi et al. |
| 7,693,889 | B1 | 4/2010 | Armorer et al. |
| 8,087,013 | B2 | 12/2011 | Kelly et al. |
| 8,495,612 | B2 | 7/2013 | Bertrand |
| 8,793,230 | B2 | 7/2014 | Engelko et al. |
| 9,043,778 | B2 | 5/2015 | Lin et al. |
| 2002/0019972 | A1 | 2/2002 | Grier et al. |
| 2002/0087271 | A1 | 7/2002 | Rozenshtein et al. |
| 2002/0188600 | A1 | 12/2002 | Lindsay et al. |
| 2003/0041127 | A1 | 2/2003 | Turnbull |
| 2003/0154216 | A1 | 8/2003 | Arnold et al. |
| 2003/0217069 | A1 | 11/2003 | Fagin et al. |
| 2003/0229610 | A1 | 12/2003 | Van Treeck |
| 2004/0002972 | A1 | 1/2004 | Pather |
| 2004/0064487 | A1 | 4/2004 | Nguyen et al. |
| 2005/0015376 | A1 | 1/2005 | Fraser et al. |
| 2005/0108733 | A1 | 5/2005 | Bermudez et al. |
| 2005/0149475 | A1 | 7/2005 | Chkodrov et al. |
| 2005/0149920 | A1 | 7/2005 | Patrizi et al. |
| 2005/0154695 | A1 | 7/2005 | Gonzalez et al. |
| 2005/0251523 | A1 | 11/2005 | Rajamani |
| 2006/0015528 | A1 | 1/2006 | Hejlsberg et al. |
| 2006/0085457 | A1 | 4/2006 | Gelfand |
| 2006/0085465 | A1 | 4/2006 | Nori et al. |
| 2006/0117029 | A1 | 6/2006 | Yingst |
| 2006/0130040 | A1 | 6/2006 | Subramanian et al. |
| 2006/0242381 | A1 | 10/2006 | Shatskih et al. |
| 2007/0038590 | A1 | 2/2007 | Vijayan et al. |
| 2007/0038651 | A1 | 2/2007 | Bernstein et al. |
| 2007/0061487 | A1 | 3/2007 | Moore |
| 2007/0079140 | A1 | 4/2007 | Metzger et al. |
| 2007/0106701 | A1* | 5/2007 | Periyasamy .................. 707/200 |
| 2007/0156849 | A1 | 7/2007 | Becker |
| 2007/0219951 | A1 | 9/2007 | Ahmed et al. |
| 2008/0098046 | A1 | 4/2008 | Alpern |
| 2008/0201701 | A1 | 8/2008 | Hofhansl et al. |
| 2008/0243966 | A1 | 10/2008 | Croisettier |
| 2009/0006884 | A1 | 1/2009 | Cahill |
| 2010/0110474 | A1 | 5/2010 | Coulter et al. |
| 2010/0281458 | A1 | 11/2010 | Paladino |
| 2012/0041988 | A1 | 2/2012 | Driesen |
| 2012/0047185 | A1 | 2/2012 | Driesen |
| 2012/0222025 | A1 | 8/2012 | Pandit |
| 2012/0239707 | A1 | 9/2012 | Figus |
| 2012/0296883 | A1 | 11/2012 | Ganesh |
| 2012/0297030 | A1 | 11/2012 | Knobel |
| 2013/0104115 | A1 | 4/2013 | Bertrand |
| 2013/0132936 | A1 | 5/2013 | Wang |
| 2014/0344798 | A1 | 11/2014 | Sasaki |

OTHER PUBLICATIONS

Lassen et al. Experiences with object oriented development in PL!SQL, Center for Object Technology COT/4-18-V1.4, 2000.

Object Cache Navigation, Oracle Call Interface PRogrammer's Guide, Release 2 (9.2), Part No. A96584-10, 1996,2002.

Date et al, A Guide to SQL/DS, 1989, Addison-Wesley, Chapter 10.

Quest Software, Inc., LiveReorg.RTM., "Reorganization for the 24.times.7, Database," 2001.

Paapanen, Eric et al., "Oracle Database Application Developer's Guide-Large Objects", 10g Release 1 (10.1), Part No. B1079601, Apr. 21, 2008, 668 pages.

Smith, Jeff, "The Shortest, Fastest, and Easiest way to compare two tables in SQL Server: Union!", Jeff's SQL Server Blog 10, Apr. 22, 2008, 45 pages.

T-SQL, "sp_rename (T-SQL)", printed Apr. 22, 2008, 3 pages.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000.

Non-final Office Action dated May 21, 2015 for U.S. Appl. No. 13/802,794.

Final Office Action dated Jun. 1, 2015 for U.S. Appl. No. 13/802,785.

Final Office Action dated Jul. 8, 2015 for U.S. Appl. No. 13/802,774.

Lassen et al. Experiences with object oriented development in PL!SQL, Center for Object Technology COT/4-18-V1.4, 2000.

Non-final Office Action dated Mar. 8, 2010 for U.S. Appl. No. 11/875,478.

Advisory Action dated Jan. 26, 2010 for U.S. Appl. No. 11/444,571.

Davidson, Tom, "Managing Schcma Changes (Part 2)," MSSQL Server Development Customer Advisory Team, Mar. 31, 2006, Microsoft Cororation. Nov. 19, 2000

Ambler, Scott, and Pramod Sadalage. Refactoring Databases: Evolutionary Database Design. Mar. 3, 2006.

Final Office Action dated Aug. 30, 2010 for U.S. Appl. No. 11/875,478.

Notice of Allowance dated Mar. 21, 2011 for U.S. Appl. No. 11/444,571.

Final Office Action dated Dec. 7, 2010 for U.S. Appl. No. 11/201,797.

Final Office Action dated Sep. 8, 2011 for U.S. Appl. No. 11/801,495.

Non-final Office Action dated Jan. 31, 2012 for U.S. Appl. No. 11/875,478.

Final Office Action dated Jan. 25, 2012 for U.S. Appl. No. 11/201,797.

(56) References Cited

OTHER PUBLICATIONS

Non-final Office Action dated Jun. 27, 2012 for U.S. Appl. No. 11/875,478.
Final Office Action dated Jan. 29, 2013 for U.S. Appl. No. 11/875,478.
Advisory Action dated Mar. 8, 2013 for U.S. Appl. No. 11/875,478.
Final Office Action dated Mar. 29, 2013 for U.S. Appl. No. 11/801,495.
Notice of Allowance dated Jun. 12, 2013 for U.S. Appl. No. 11/875,478.
Notice of Allowance dated Jan. 16, 2015 for U.S. Appl. No. 13/802,780.
Non-final Office Action dated Nov. 20, 2014 for U.S. Appl. No. 13/802,785.
Non-final Office Action dated Jul. 31, 2014 for U.S. Appl. No. 13/802,794.
Final Office Action dated Jan. 16, 2015 for U.S. Appl. No. 13/802,794.
"Oracle OLAP", Oracle, Jan. 3, 2012, 2 pages url:.
"Introduction to Analytic Workspaces", Oracle OLAP DML Reference, 11g Release 1 (11.1), Part No. B28126-03, Oracle, Mar. 18, 2013, 2 pages.
Non-final Office Action dated Feb. 12, 2015 for U.S. Appl. No. 13/802,774.
Non-final Office Action dated Mar. 27, 2015 for U.S. Appl. No. 13/802,771.
Notice of Allowance and Fees Due dated Oct. 21, 2015 for related U.S. Appl. No. 13/802,785.
Final Office Action dated Oct. 23, 2015 for related U.S. Appl. No. 13/802,771.
Notice of Allowance and Fees Due dated Nov. 25, 2015 for related U.S. Appl. No. 13/802,774.
Notice of Allowance and Fee(s) Due dated Jan. 6, 2016 for related U.S. Appl. No. 13/802,794, 6 pages.
Non-final Office Action dated May 11, 2016 for related U.S. Appl. No. 13/802,771.

\* cited by examiner

REDUCING DOWNTIME DURING UPGRADES OF INTERRELATED COMPONENTS IN A DATABASE SYSTEM

RELATED APPLICATIONS

The present application claims the benefit of priority to U.S. Provisional Patent Application Ser. No. 61/707,823, entitled "ONLINE PATCHING ORCHESTRATION", filed on Sep. 28, 2012, and U.S. Provisional Patent Application Ser. No. 61/707,827, entitled "CONFIGURATION CHANGE DETECTION AND PROPAGATION", filed on Sep. 28, 2012, and U.S. Provisional Patent Application Ser. No. 61/707,840, entitled "SYNCHRONIZING DOMAIN CONFIGURATION PARAMETERS", filed on Sep. 28, 2012, which are all hereby incorporated by reference in their entireties; and the present application is related to co-pending U.S. patent application Ser. No. 13/802,771, entitled "USING A DATA DICTIONARY TO DETERMINE AN UPGRADE EDITION OF A RELATIONAL DATABASE TABLE", filed on even date herewith, which is hereby incorporated by reference in its entirety; and the present application is related to co-pending U.S. patent application Ser. No. 13/802,774, entitled "ONLINE UPGRADING OF A DATABASE ENVIRONMENT USING TRANSPARENTLY-PATCHED SEED DATA TABLES", filed on even date herewith, which is hereby incorporated by reference in its entirety; and the present application is related to co-pending U.S. patent application Ser. No. 13/802,780, entitled "TRANSPARENTLY UPGRADING DERIVED DATABASE OBJECTS", filed on even date herewith, which is hereby incorporated by reference in its entirety; and the present application is related to co-pending U.S. patent application Ser. No. 13/802,785, entitled "USING CONFIDENCE VALUES FOR SYNCHRONIZING FILE SYSTEMS"filed on even date herewith, which is incorporated by reference in its entirety; and the present application is related to co-pending U.S. patent application Ser. No. 13/802,794, entitled "SYNCHRONIZATION OF CONFIGURATION CHANGES BETWEEN APPLICATIONS AND THEIR PLATFORMS", filed on even date herewith, which is hereby incorporated by reference in its entirety.

Certain aspects in some embodiments of the present application are related to material disclosed in U.S. patent application Ser. No. 11/875,478 now U.S. Pat. No. 8,521,706, entitled "LOW-DOWNTIME AND ZERO-DOWNTIME UPGRADES OF DATABASE-CENTRIC APPLICATIONS"filed on Oct. 19, 2007, the content of which is incorporated by reference in its entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database system environments and more particularly to techniques for reducing downtime during upgrades of interrelated components in a database system.

BACKGROUND

Some embodiments of the present disclosure are directed to an improved approach for reducing downtime during upgrades of interrelated components in a database system.

Reducing downtime of computing systems while upgrading is a goal that has been long sought after. Legacy approaches have addressed the problem by deploying techniques to upgrade one or another type of data found in an installation of a computing system, while relying on some other technique to upgrade other types of data found in the same installation. For example, legacy techniques have provided for upgrade of software applications by overwriting or up-versioning the file containing the application software code followed by a "restart" (e.g., of the application or of the operating system). Other legacy techniques have implemented approaches to upgrade a file system, most often by shutting the file system down (e.g., incurring downtime) during the upgrade. Still other legacy techniques have addressed the task of upgrading a relational database by shutting down the relational database for a duration, then upgrading the database structures and restarting the relational database. In some environments, legacy techniques shut down the application servers while keeping the file system and database servers running in order to accept the upgrades.

While these legacy techniques have enjoyed varying usage when applied individually, such legacy techniques do not address the needed coordination of orchestration of an installation-wide upgrade of all types of components. Strictly as examples of the deficiencies of the aforementioned individual legacy techniques, an upgraded application might include certain assumptions of an underlying file system (e.g., either format or content), and those assumptions might not become true until a certain time after the software application as well as the file system have both been successfully upgraded. Again, strictly as examples of the deficiencies of the aforementioned individual legacy techniques, an upgraded application might include certain assumptions of a relational database system (e.g., either by definition of relations or content of tables), and those assumptions might not become true until a certain time after the software application as well as the relational database system have both been successfully upgraded.

Further, in modern environments, the corpus of software application code modules, plus the relational database storage, plus the file system can comprise a storage footprint in the terabytes or petabytes, which presents a practical constraint to the legacy techniques in that the legacy techniques may incur long downtimes during upgrades.

An improved approach, namely an approach to orchestrate the upgrades of software applications together with a file system, together with a relational database is needed. The present disclosure provides an improved method, system, and computer program product for orchestration of database objects, file systems, and applications during online patching.

SUMMARY

The present disclosure provides an improved method, system, and computer program product suited to address the aforementioned issues with legacy approaches.

Disclosed herein are methods, systems, and computer program products for reducing downtime during upgrades of interrelated components in a computing environment. The method commences while at least one running software application is executing within the computing environment by loading a plurality of database objects from an initial run edition into a patch edition. The database objects comprise at least one software application code module, at least one relational database table, and at least one file system. The method continues by applying at least one patch to the software application code module(s) corresponding to the running software application(s) to create patched software application(s), then applying patches to the relational database table to create a patched relational database table, and further applying a patch to the file system to create a patched file system. When the subject patches have been applied, the method stops the running software application(s) and starts the patched software application(s).

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1:
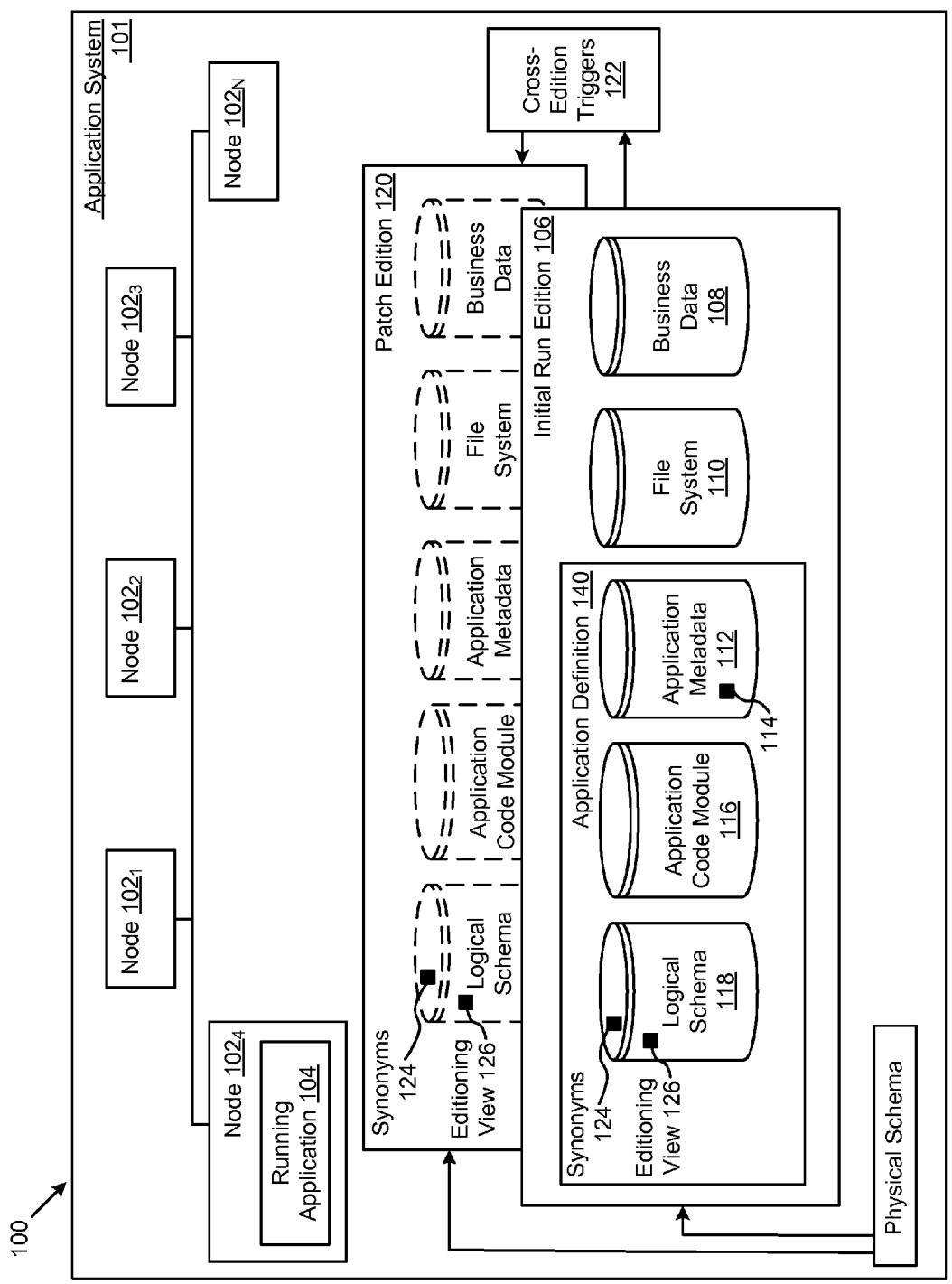
FIG. 1 depicts an example installation for reducing downtime during upgrades of interrelated components in a database system, according to some embodiments.

Some embodiments of the present disclosure are directed to an improved approach for reducing downtime during upgrades of interrelated components in a database system. More particularly, disclosed herein are exemplary environments, methods, and systems.

Overview

Described herein-below and in the accompanying figures are scalable methods and apparatus for reducing downtime during upgrades of interrelated components in a database system.

As earlier indicated, system downtime or other outage due to upgrading (e.g., patching) is a major concern in the design of enterprise-wide infrastructure and mission-critical systems. System downtime is especially serious for installations that are configured as a centralized installation, in turn serving many distributed installations. System outages can impact all operations, and system outages often incur great cost when the system outage interferes with customer-related interactions (e.g., sales, service, payments, etc.) or another core business activity (e.g., incoming inspection, manufacturing, etc.). The herein-disclosed techniques for upgrades of installation-wide infrastructure (e.g., including patches or upgrades of software (e.g., software applications and/or software application services, upgrades of file system format and/or content, upgrade of relational database objects, etc.) facilitate the trend to deploying fewer enterprise-wide sites and fewer installations of mission-critical systems without adversely impacting business activities that rely on nearly non-stop uptime of their corresponding computing systems.

The upgrade techniques disclosed herein includes a set of features known as "Edition-Based Redefinition" (EBR). Edition-Based Redefinition enables application patches to be applied with dramatically reduced downtime by executing database patch actions on a "patch edition" (virtual copy) of the runtime system. While an online patch is executing, the production application remains available and fully functional.

Definitions

Some of the terms used in this description are defined below for easy reference. The presented terms and their respective definitions are not rigidly restricted to these definitions—a term may be further defined by the term's use within this disclosure.

"Edition-Based Redefinition" or "EBR" refers to techniques that enable application patches to be applied with dramatically reduced downtime, for example, by executing database patch actions on a "patch edition" (e.g., a wholly or partially virtual copy) of the runtime system.

"EV" refers to Editioning View. A database view that maps logical column names to physical column names per edition.

"FCET" refers to Forward Cross-Edition Trigger. Used to upgrade table data into new or revised columns.

(NE!–>E)" refers to the constraint statement: "Non-Editioned objects should not depend on Editioned Objects". This restriction limits how non-editioned objects can be defined. Also referred to as the "Editioning Constraint".

"UDT" refers to User Defined Type, a developer-defined composite data type or data structure.

"ADPATCH" refers to a Patch Execution tool.

"Application Top" refers to a directory tree on the middle-tier file system containing all files that make up the application definition, including code (forms, reports, Java, executables, scripts), configuration, and patching data.

"Seed Data" refers to information in database tables that is used by applications. Seed data is distinct from business data. As used herein seed data is subject to patching.

"Seed Data Loader" refers to a patch utility to load Seed Data updates into a target database.

"Schema Patcher" refers to a patch utility to apply schema definition changes (tables, views, indexes, sequences, etc.) to a target database.

Access Policy" refers to logic optionally associated with a database object that restricts access to data through that object.

The term "logic" means any combination of software or hardware that is used to implement all or part of the embodiments of the present disclosure.

A "module" includes any mix of any portions of computer memory and any extent of circuitry including hard-wired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean inclusive "or" rather than exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 depicts an example installation 100 for reducing downtime during upgrades of interrelated components in a database system. As an option, the present example installation 100 may be implemented in the context of the architecture and functionality of the embodiments described herein. Also, the example installation 100 or any aspect therein may be implemented in any desired environment.

The depiction of the installation 100 introduces several concepts as shown an described herein. As shown, the installation comprises an application system 101 (e.g., a cluster environment, a portion of a database engine, etc.) which in turn comprises computing nodes (e.g., node $102_1$, node $102_2$, node $102_3$, node $102_4$, node $102_N$, etc.) any of which computing nodes can communicate with any other of the computing nodes. A software application (e.g., running software application 104) executes on a computing node and accesses stored data (e.g., business data 108, one or more instances of a file system 110). A software application can also access stored data in various application-specific embodiments, (e.g., application metadata 112, application code modules 116, and logical schema 118).

The application code modules 116 serves to store one or more copies of the software application, while the application metadata 112 serves to store data that is specific to the application (e.g., disjoint from the business data 108). The application metadata 112 can comprise application-specific data in the form of seed data 114, which can be used by the application to initialize data structures (e.g., screens, forms, menus, etc.) used by a running software application.

A particular collection of interrelated components in a database system (e.g., application metadata 112, application code modules 116, logical schema 118, business data 108, one or more instances of a file system 110, etc.) can be amalgamated into an "edition" (e.g., an initial run edition 106), which edition can then be subjected to transformations (e.g., data copies, data references, data conversions, etc.) into one or more other editions (e.g., patch edition 120), as shown.

In order to facilitate for reducing downtime during upgrades of interrelated components in a database system, the collection of interrelated components are handled using the techniques disclosed herein. Strictly as an introductory example, an instance of a running software application can access an initial run edition, or an instance of a running software application can access a patch edition. Various techniques for managing the timing and type of access are provided for by the editioning view 126 and by use of synonyms 124. For example, a synonym can be modified to refer to a logical schema of the initial run edition, or a synonym can be modified to refer to a logical schema of a patch edition.

As can be recognized by those skilled in the art, a first instance of a running software application can access make changes to an initial run edition, and such changes can be detected and propagated to a patch edition using the cross-edition triggers 122. Thus, the second instance of the running software application can access the changes that had been propagated to the patch edition.

The various techniques for copying, referencing, transforming and otherwise managing the location (e.g., physical copy, virtual copy, etc.) of data as well as techniques for managing the timing and type of access observed by the running software application are discussed in detail infra.

"The Application"

A running installation of a suite of enterprise software applications comprises a vast and complex system made up of many individual parts that are broadly separated into a taxonomy as follows:

A platform (e.g., storage hardware and software, servers, network components, OS, database hardware and software, middleware hardware and software, system management hardware and software, etc.), and One or more software applications (e.g., application code modules, application schema, code, application metadata, etc.)

Components within an installation can be further described as comprising:

Application Schema—Application schema codifies a relational data model for accessing items stored in the application system 101 (e.g., tables, relationships, indexes, etc.). An instance of application schema defines the structure of the data being managed—it is not the data itself. The application schema is often managed while observing a two layer approach comprising physical schema and logical schema:

The Physical Schema describes how information is actually stored in database tables.

The Logical Schema is a stable view of the relevant parts of the physical schema presented to the application code modules. The logical schema is often defined in terms of the physical schema using synonyms, views and access policies. In exemplary embodiments, the logical schema defines what is "seen" when an application code module connects to the relational data.

Application Code Modules—These modules comprise executable logic that controls how the application operates. Instances of application code modules run on the database, middle-tier application servers, and in client devices. Application code modules can be written in a variety of programming and/or scripting languages.

Application Metadata—This is data that participates in controlling how the application operates (e.g., initial look-and-feel, user customizations, etc.). This data can be stored in files on the files system, and/or in tables in a database. Metadata that is loaded into database tables is called "seed data". In some cases, metadata can be altered during application runtime. Users often edit application metadata to tailor functionality to their particular user-specific requirements.

Business Data—This often refers to customer-owned transaction data or reference data that is stored in accordance with the application schema. Uses of patches as herein-described can modify how business data is stored (e.g., corresponding to an instance of an application schema), however the patching embodiments herein do not explicitly create or explicitly delete customer business data.

The techniques described herein provide for online patching of applications (and respective application data) as well as for the online patching and online transformation of business data (e.g., transformation to an updated application schema).

Application Editions

A collection of schema, code and metadata definitions comprise an application definition 140. Components of the application definition may need to change over time, and the techniques herein prescribe how each part of the application definition are to be versioned and patched independently. Therefore, an application definition in a particular installation is known by a compound "version ID" comprised of the union of the versions of all of its constituent parts. An installed collection of versioned part definitions is referred to as an Application Edition. In exemplary cases, an application definition is stored both on the file system and in the database. Further it is typical to store multiple Application Editions within one installation, and in such cases both the file system and database are used to hold a run edition version and one or more patch edition versions of the application definition.

File System Editions

A file system edition is a set of the files that make up an application definition. The files may be organized into a hierarchical directory tree with a root directory known as the "Application Top" or other convenient designation. In some cases, the Application Top path for an installation is stored in an operating system environment variable. It is possible to store multiple Application Top directory trees in the same file system.

In the context of the installation depicted and described in FIG. 1, and following the purpose and definition of an edition and an edition's constituent components, a cycle can be followed so as to upgrade editions in a database system while maximizing the availability of the installation's functionality.

Figure 2:
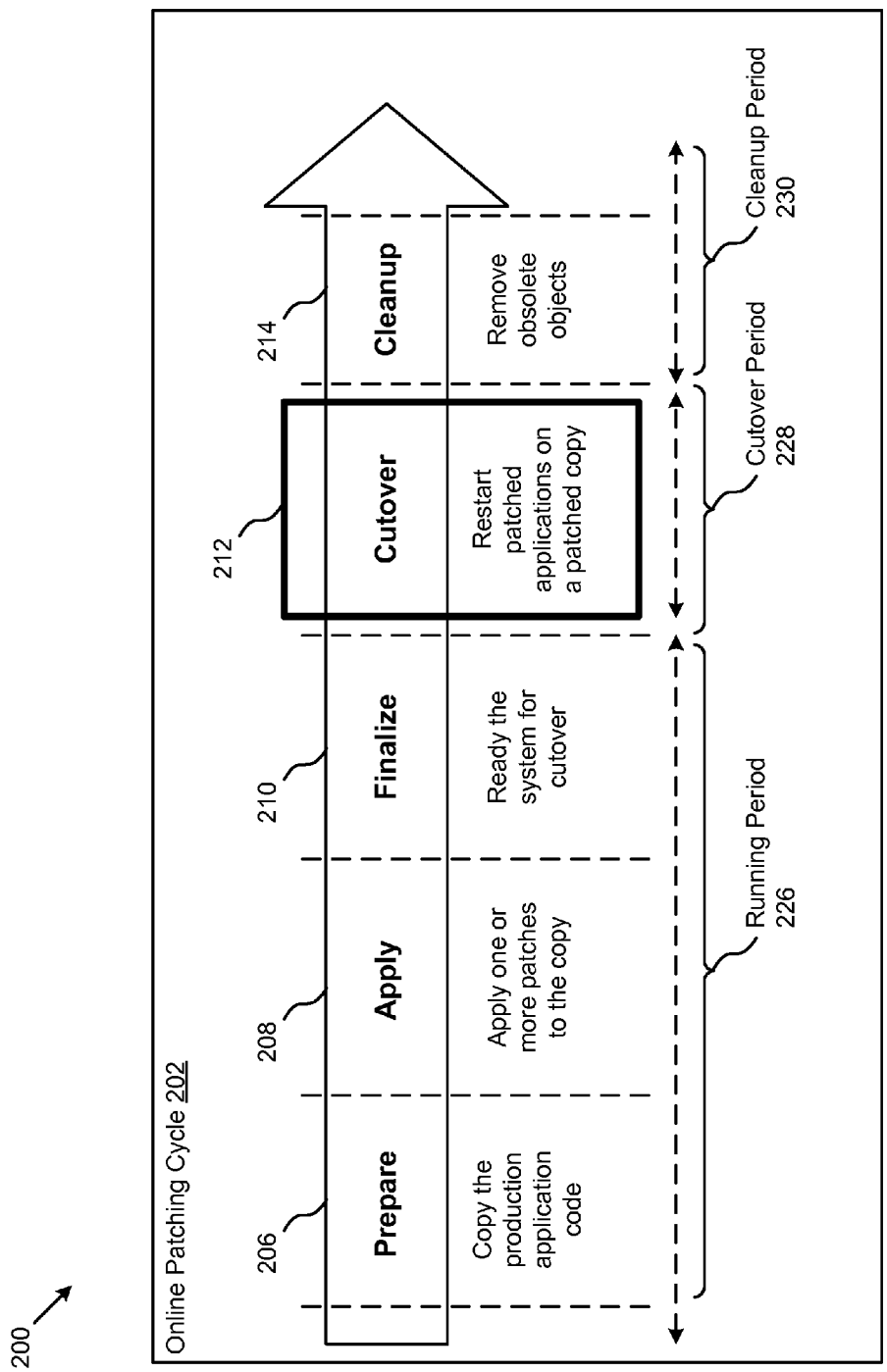
FIG. 2 depicts a cycle to manage edition components for reducing downtime during upgrades of interrelated components in a database system, according to some embodiments.

FIG. 2 depicts a cycle 200 to manage edition components for reducing downtime during upgrades of interrelated components in a database system. As an option, the present cycle 200 may be implemented in the context of the architecture and functionality of the embodiments described herein. Also, the cycle 200 or any aspect therein may be implemented in any desired environment.

To apply an online patch to an active/online installation, the installation is promoted through a series of sequential phases known as an online patching cycle. The shown online patching cycle 202 is given as:

PREPARE a patch edition (see online patch cycle prepare step 206).

APPLY a patch or patches to a patch edition (see online patch cycle apply step 208).

FINALIZE to get the system ready for cutover (see online patch cycle finalize step 210).

CUTOVER to patch edition (see online patch cycle cutover step 212).

Shutdown software applications and application services.

Set patch edition as the new run edition.

Startup software applications and application services.

CLEANUP old objects or editions (see online patch cycle cleanup step 214).

As described in the above cycle, creating and patching relies on many specialized techniques to maintain a run edition (e.g., initial run edition 106) and one or more patch editions (e.g., patch edition 120) in the presence of continuously changing customer data in database tables (e.g., in the business data 108). The concept and implementation of "Edition-Based Redefinition" creates patch edition copies of application code modules and data in order to continuously apply patch transformations to runtime data that changes while the patch is executing.

The users can be all online users during the normal operation (e.g., during the running period 226), then for the brief period of the cutover (e.g., during the cutover period 228) the users are offline, to return online (e.g., in cleanup period 230) shortly after conclusion of the period of the cutover.

One embodiment supports full installation online patching. Some installations comprise many products (e.g., hundreds of software application configurations, and many tens of thousands of tables). In such a case it is convenient to deploy every installation to contain all products (though only some may be licensed for a particular installation) and then to patch all products that are included in every installation. In this manner, all products can be periodically updated to stay current with the recommended code levels.

Implementing the above cycle to manage edition components for reducing downtime during upgrades relies in part on a particular configuration of an edition. An approach to forming such a particular configuration of an edition is discussed below.

Figure 3:
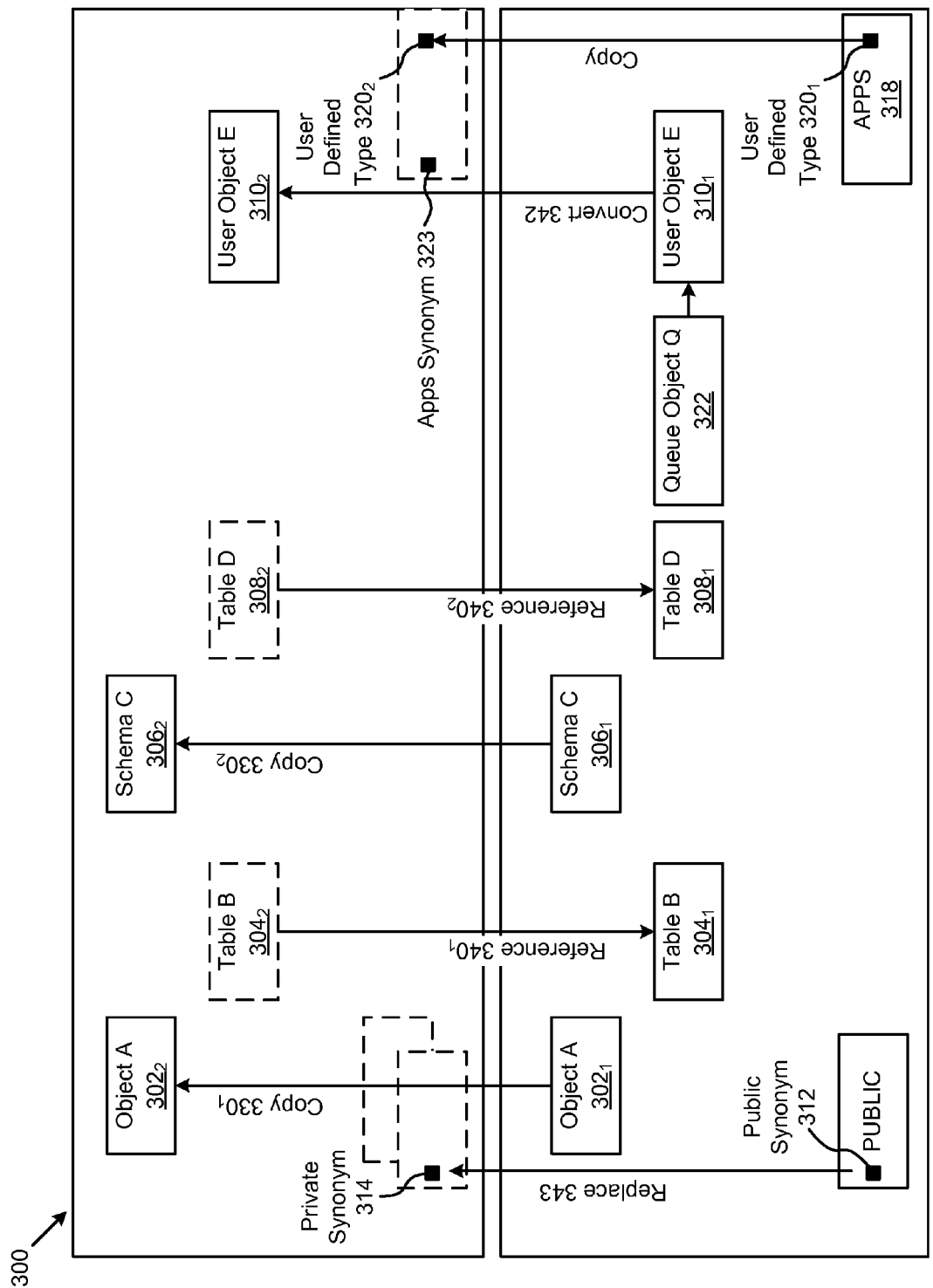
FIG. 3 depicts selected uses of an edition-based redefinition scheme used in reducing downtime during upgrades of interrelated components in a database system, according to some embodiments.

FIG. 3 depicts selected uses of an edition-based redefinition scheme 300 used in reducing downtime during upgrades of interrelated components in a database system. As an option, the present edition-based redefinition scheme 300 may be implemented in the context of the architecture and functionality of the embodiments described herein. Also, the edition-based redefinition scheme 300 or any aspect therein may be implemented in any desired environment.

The depiction in FIG. 3 comprises an exemplary application of edition-based redefinition. This scheme supports efficient storage of multiple application editions in the same database engine.

In the application system 101 of FIG. 1, all objects stored in the database have a unique name that identifies the object. In some cases, an object name use a two-part name space, codified as {owner, object_name}. For objects that can be editioned (see FIG. 3) an additional element is added to the namespace, namely an identifier for the edition.

The "edition-legal" namespace is thus: {EDITION, OWNER, OBJECT_NAME }. This extension of the namespace allows the database to store multiple versions of the same object from an {OWNER, OBJECT_NAME } namespace.

EXAMPLES

[EDITION_1] APPS.PROFILE/* PROFILE version 12.2.0*/
[EDITION_2] APPS.PROFILE/* PROFILE version 12.2.1*/

In exemplary usage, each connected database session has a current_edition_name context that identifies the edition used to resolve references to editioned objects. In accordance with the notion of edition-based redefinition software, an application code module does not reference the edition name of a referenced object explicitly. Instead, the edition portion of an identifier is always determined by the session context (e.g., in a prepare cycle, or in a finalize cycle, or in a cutover cycle, etc.). For example, a running software application 104 refers to non-editioned objects in the initial run edition 106 only through editioned synonyms 124. The edition of synonyms 124 in turn is specified by the session context.

When a patch edition is created, it inherits the existing definitions of the objects from the run edition. If editioned objects are created or replaced in the patch edition, such changes will not be visible in the run edition. Changes to non-editioned objects will affect all forward editions, so these objects are be covered with an editioned indirection layer or otherwise handled to avoid impacting the running software application. Indeed not all objects are editioned. In some cases only certain types of objects are editioned (as mentioned above). Specifically, some objects are not subject to editioning (see the Editioning Constraint infra):

Referring to the selected uses of an edition-based redefinition scheme as shown in FIG. 3, some objects are copied from the run edition (e.g., initial run edition 106) to a patch edition (e.g., patch edition 120). As shown, a to-be-patched object A 302$_1$ is copied to editioned object A 302$_2$ (see copy 330$_1$). Similarly, a to-be-patched schema C 306$_1$ is copied to editioned schema C 306$_2$ (see copy 330$_2$). However, Table B 304$_2$ is merely referenced (and not copied) using Table B reference 304$_2$; the Table B reference 304$_2$ points to Table B 304$_1$ of the run edition. Similarly, Table D 308$_2$ is merely referenced (and not copied) using Table D reference 308$_2$; the Table D reference 308$_2$ points to Table D 308$_1$ of the run edition.

Also shown in FIG. 3 is a PUBLIC object that comprises one or more PUBLIC synonyms that point to editioned objects. PUBLIC synonyms that point to editioned objects (e.g., instances of PUBLIC synonym 312) are purposely dropped, and any reference to such a PUBLIC synonym is replaced (see replace operation 343) with equivalent private synonyms 314 in the referencing schemas (also see FIG. 4).

Other non-editioned types shown in FIG. 3 include user-defined types (e.g., user-defined type 320$_1$ and copied user-defined type 320$_2$), a user object E 310$_1$ and a queue object Q 322, which are handled by a conversion process (see convert 342). Such a conversion process is further described in the discussion of FIG. 5.

This scheme introduces additional concepts, namely "Editioning Views" and "Cross-edition Triggers", which are now briefly discussed.

Cross-Edition Triggers

The edition-based redefinition scheme introduces a function called a cross-edition trigger. A cross-edition trigger is a database table trigger that is triggered from one edition and then executes in another edition. For example, an update statement from the running software application (e.g., a run edition) can fire a cross-edition trigger that executes transformation logic in the Patch Edition. Cross-edition triggers are used to transform data forwards and backwards across corresponding storage columns in different database editions. Exemplary uses of cross-edition triggers are further discussed in FIG. 6.

Editioning Views

The edition-based redefinition scheme introduces a new restricted form of database view called an editioning view. An editioning view (EV) can only select individual columns of a table such as "COLUMN1, COLUMN2, COLUMN3". An editioning view cannot select expressions involving columns such as "UPPER(COLUMN1)", or "(COLUMN2+ COLUMN3)/2". The function of an editioning view serves to expose a subset of table columns from a single table, and as such, an editioning view is not allowed to contain a "where" clause or any type of expression. The EV is used to map logical column names (used by the application code modules) to the actual table columns where the data is stored. This allows the application code modules to be written using stable logical column names, even though the underlying table columns may be different in any two database editions. Further, the EV as hereinabove defined addresses performance aspects due to its restricted form. Embodiments of editioning views are further described in the discussion of FIG. 7.

Figure 4:
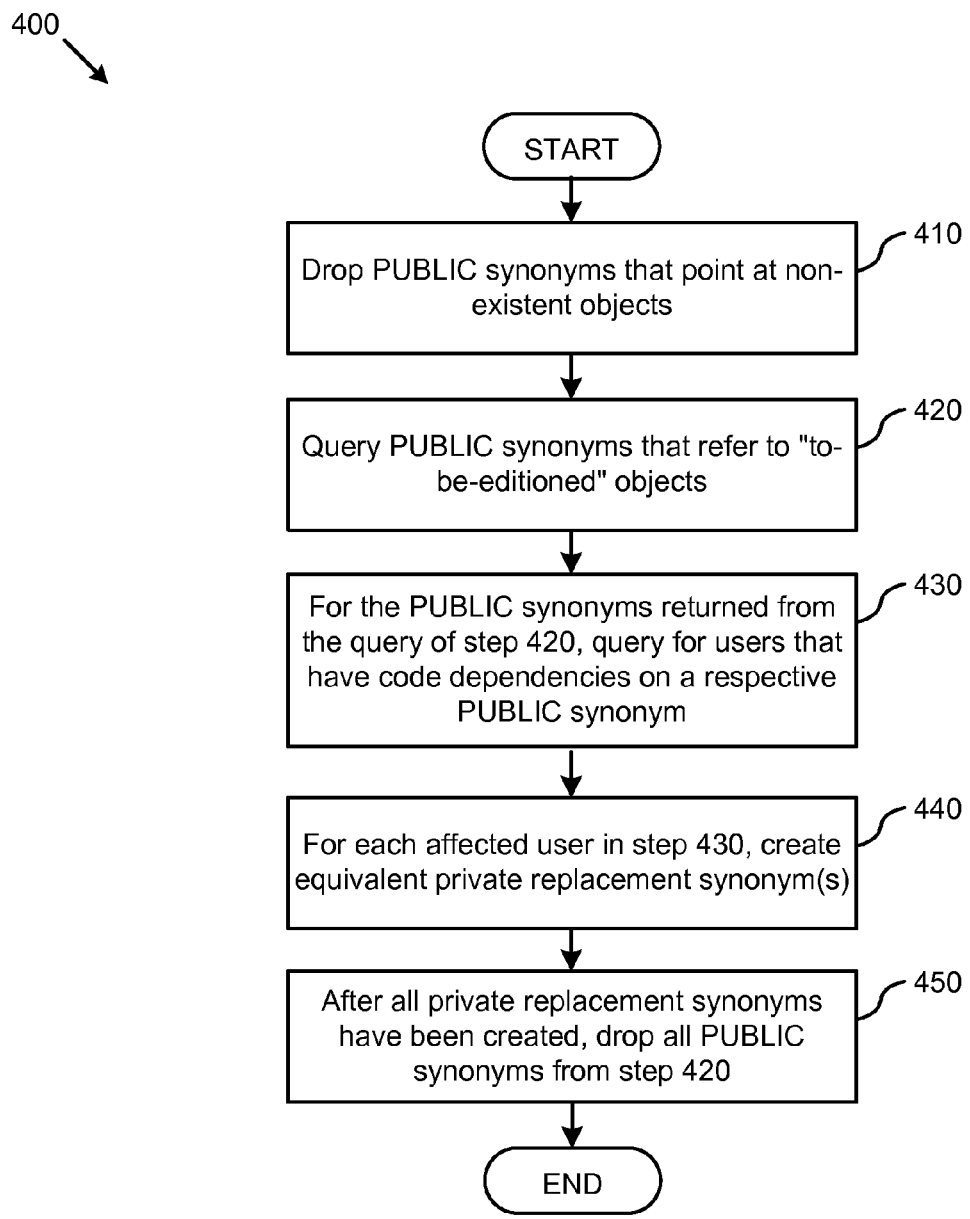
FIG. 4 presents a flow chart of selected edition readiness operations used in reducing downtime during upgrades of interrelated components in a database system, according to some embodiments.

FIG. 4 presents a flow chart of selected edition readiness operations 400 used in reducing downtime during upgrades of interrelated components in a database system. As an option, the selected edition readiness operations 400 may be implemented in the context of the architecture and functionality of the embodiments described herein. Also, the selected edition readiness operations 400 or any aspect therein may be implemented in any desired environment.

The Editioning Constraint

As used herein, editioning is enabled per database user. All editionable objects in a particular schema are either editioned or not editioned. Since not all database objects are editioned, and since the definition of one object can depend on another object, an important constraint known as the editioning constraint is to be satisfied before editioning can be enabled:

*NE!->E*: Non-editioned objects may not depend on
    editioned objects                                    (Expression 1)

Thus, techniques are herein provided to resolve possible "NE!->E" violations that would be produced by enabling editions on schemas. Many of such violations fall into the following exemplary categories:

PUBLIC Synonyms that refer to editioned objects.
Tables and Queues that depend on editioned User Defined Types.
Materialized Views that depend on editioned objects. Materialized View definitions often depend on editioned objects such as views and synonyms. Yet, materialized views are a non-editioned object type and are to be recast into an alternate implementation.

Custom and Third-party schemas that depend on editioned objects.

Indexes and indexing procedures that depend on editioned objects.

As listed above, the PUBLIC objects comprise one of several internal database schemas that cannot be editioned; PUBLIC objects are not editioned. PUBLIC synonyms that point to editioned objects must be dropped, and any reference to these PUBLIC synonyms 312 must be replaced (see replace operation 343) with equivalent private synonyms 314 in the referencing schemas. This is done as follows:

Drop PUBLIC synonyms that point at non-existent objects (see operation 410)

Query PUBLIC synonyms that point at "to-be-editioned" objects (see operation 420)

For each PUBLIC synonym in operation 420, query the users that have code dependencies on that PUBLIC synonym (see operation 430)

For each affected user in operation 430, create the equivalent private synonym (see operation 440)

After all private replacement synonyms have been created, drop all PUBLIC synonyms from operation 420 (see operation 450).

As earlier mentioned, a running software application 104, refers to non-editioned objects in the initial run edition 106 only through the synonyms 124. The synonyms 124 in turn use the session context to name the edition. Further, when application code references an editioned identifier, the edition portion of the identifier (including use in a synonym 124) is determined by the session context (e.g., referring to objects through an edition name such as EDITION_1, EDITION_2, etc.). For example, a running software application 104, refers to non-editioned objects in the initial run edition 106 only through the synonyms 124. The synonyms 124 in turn use the session context to name the edition. Moreover, a selected set of synonyms 124 are selected by the edition property of the session context.

Figure 5:
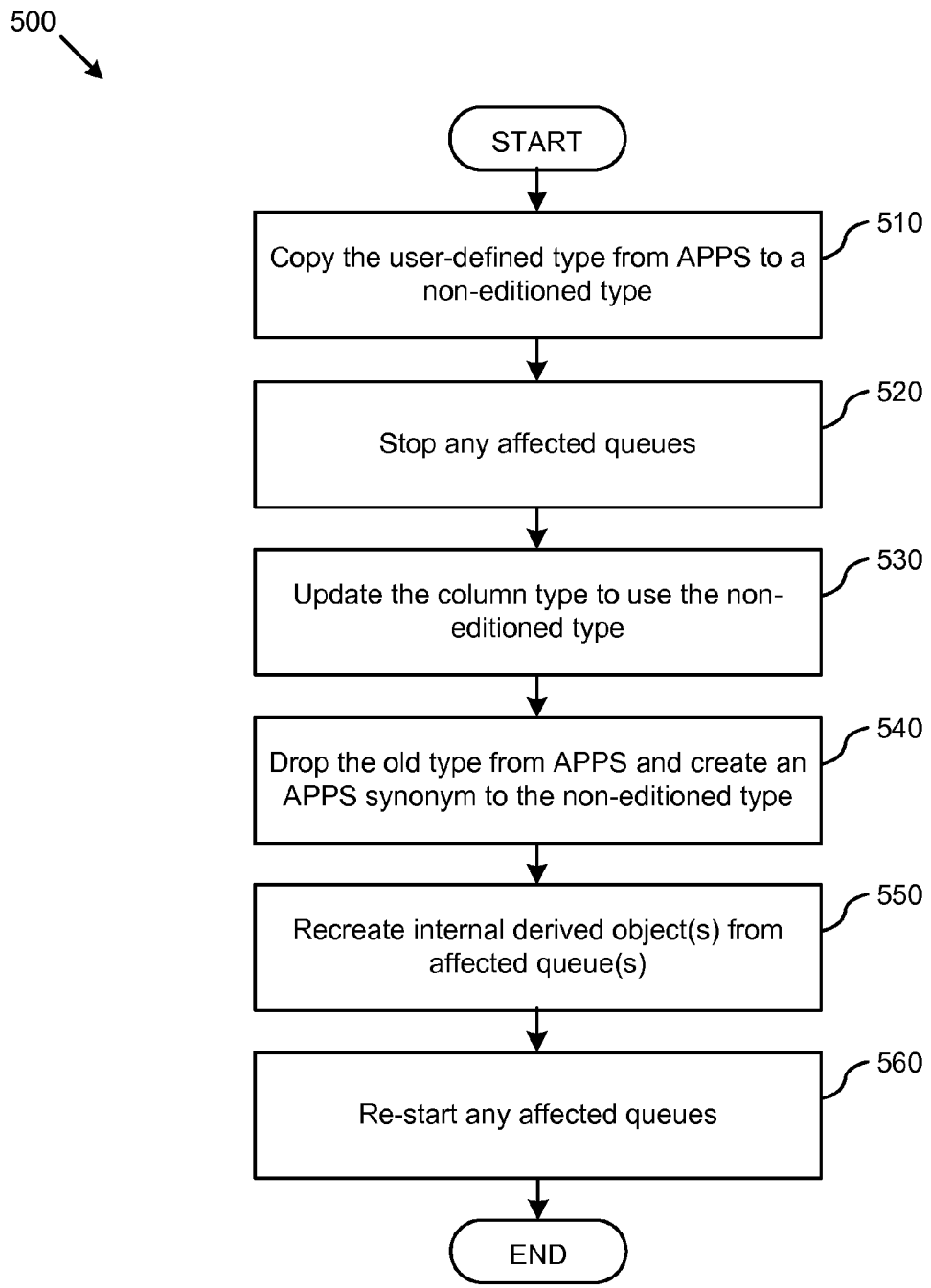
FIG. 5 depicts a flow to manage editioned user-defined type components for reducing downtime during upgrades of interrelated components in a database system, according to some embodiments.

FIG. 5 depicts a flow 500 to manage editioned user-defined type components for reducing downtime during upgrades of interrelated components in a database system. As an option, the present flow 500 may be implemented in the context of the architecture and functionality of the embodiments described herein. Also, the flow 500 or any aspect therein may be implemented in any desired environment.

Handling Tables and Queues that Depend on Editioned user Defined Types

Some installations include table/queue columns that are defined using user defined types (UDTs). However, since the editioning constraint prevents a table column from depending on an editioned data type, these table/queue columns are to be converted and/or otherwise modified (e.g., to depend on an equivalent non-editioned type).

One embodiment of such a conversion proceeds through the flow below:

Copy the UDT types in order to create an equivalent non-editioned type from the editioned type (see operation 510).

Stop any affected queues (see operation 520).

Update the column type to use the non-editioned type (see operation 530).

Drop the old editioned type from APPS storage 318 and create an APPS synonym 323 to the non-editioned type (see operation 540).

Recreate internal derived objects from the affected queues (see operation 550).

Re-start any affected queues (see operation 560).

In another embodiment, UDTs are marked as non-editioned, and applications observe the rules for handling non-editioned objects.

Figure 6:
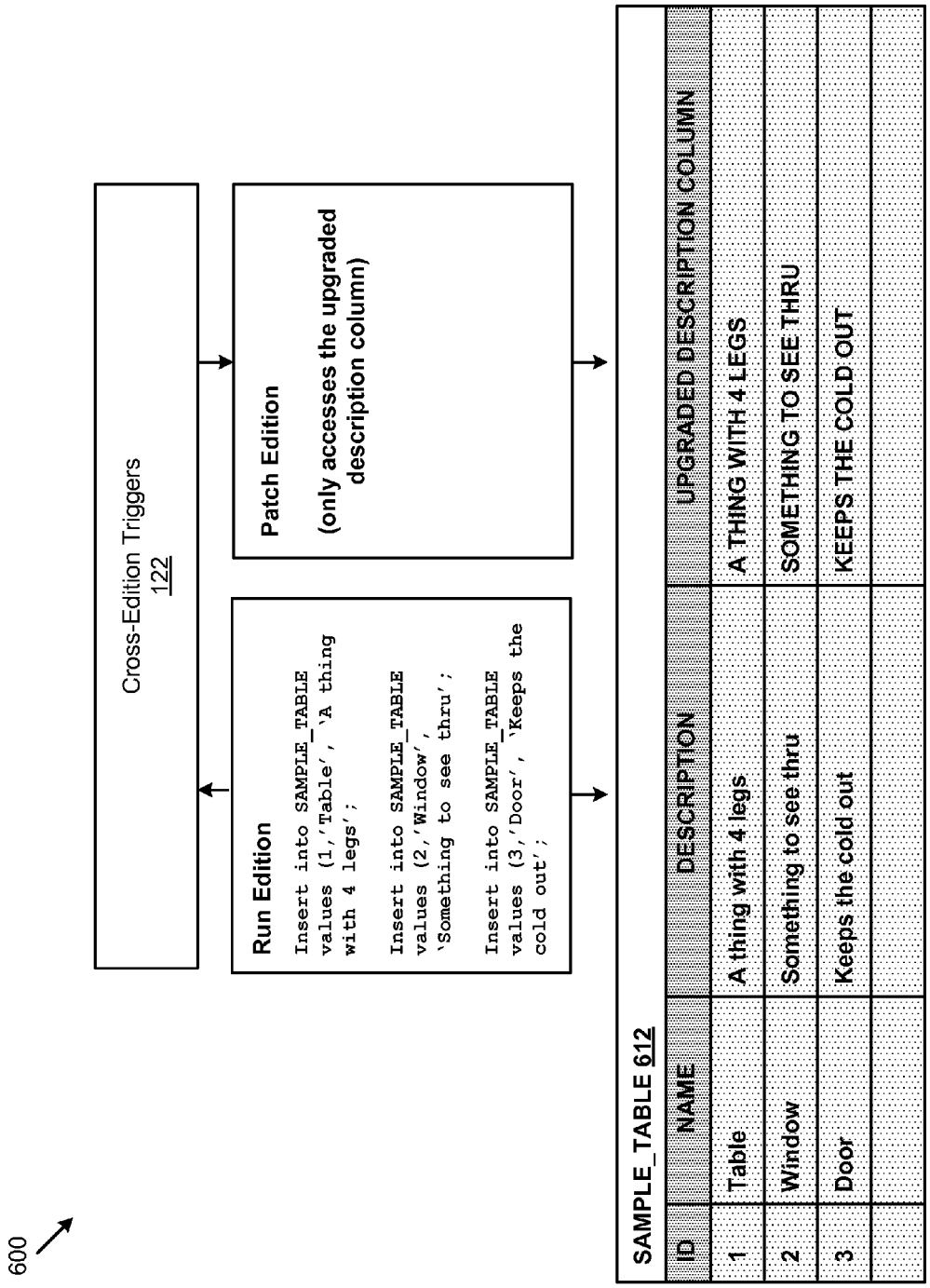
FIG. 6 is a schematic showing the effects of cross-edition triggers used for reducing downtime during upgrades of interrelated components in a database system, according to some embodiments.

FIG. 6 is a schematic 600 showing the effects of cross-edition triggers used for reducing downtime during upgrades of interrelated components in a database system. As an option, the present schematic of cross-edition triggers may be implemented in the context of the architecture and functionality of the embodiments described herein. Also, the cross-edition triggers or any aspect therein may be implemented in any desired environment.

In exemplary usage, if a table, a structure or other data (e.g., table 612) is to be updated in a way that is incompatible with the running software application, then the change is to be implemented using new table columns and a "Forward Cross-edition Trigger" (FCET) is defined (see cross-edition triggers 122). The Forward Cross-edition Trigger is a type of table trigger created for use in online data upgrades. It has the property of affecting the Patch Edition after being triggered from the Run Edition and executing in the Patch Edition. Using new columns and Forward Cross-edition Triggers, developers can upgrade data in the Patch Edition while the application continues to operate in the Run Edition. The technique works as follows:

Create new base columns or revised columns to hold patched data. The new table columns are delivered through a schema patching tool. The Editioning View of the run edition prevents the new columns from being "seen" by the running software application.

The Table Manager PATCH procedure will regenerate the Editioning View in the

Patch Edition so that it picks up the new columns. The new columns are now visible to the patch edition of the application, but empty of data.

Install a Forward Cross-edition Trigger that will populate the new columns. Application developers code a Forward Cross-edition Trigger instead of the update statement that would be used in a classic downtime patch. The FCET takes input from the "old" columns (and any other data source), computes the new values, and stores results in the new columns. The FCET is initially created "disabled" so that it can be installed and validated without affecting the running software application.

Apply the FCET to the table. The trigger is enabled and then each row of the table is fake-updated, causing the trigger to fire and populate the new columns. The FCET will also fire if the running software application inserts or updates data in the table. This keeps the new columns in sync with ongoing changes from the running software application.

Figure 7:
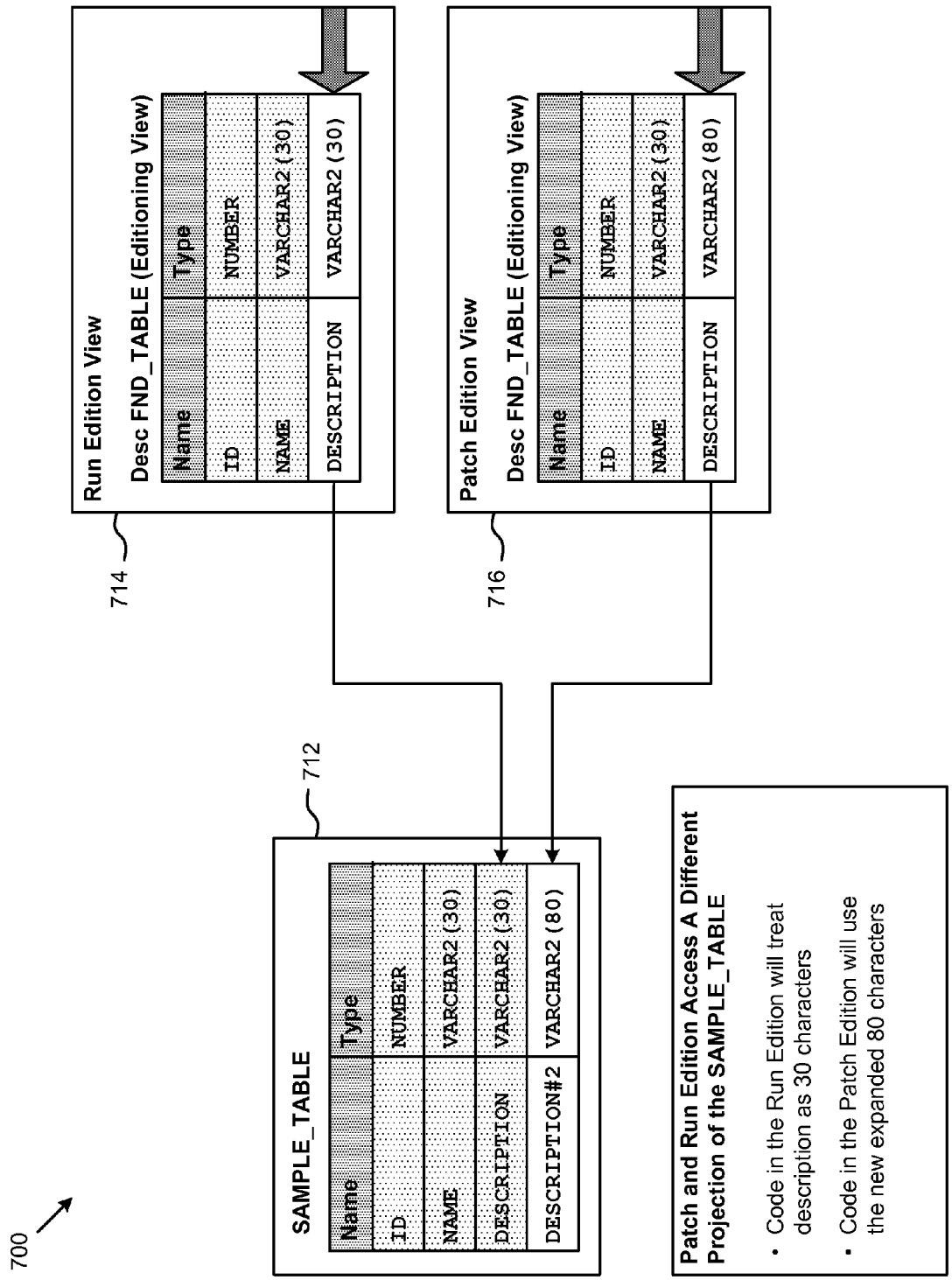
FIG. 7 is a schematic showing uses of a database editioning view used in reducing downtime during upgrades of interrelated components in a database system, according to some embodiments.

FIG. 7 is a schematic showing uses of a database editioning view 700 used in reducing downtime during upgrades of interrelated components in a database system. As an option, the present database editioning view 700 may be implemented in the context of the architecture and functionality of the embodiments described herein. Also, the database editioning view 700 or any aspect therein may be implemented in any desired environment.

Editioning View Layer

The Editioning View layer provides a stable "cover" (logical view) of the physical schema. The editioning enablement process (see FIG. 8) installs an editioning view over each developer-managed table (e.g., a developer-managed table is a table that is created and maintained during patching). In contrast, an application-managed table is created and maintained by application logic during application runtime. In exemplary embodiments, application-managed tables will not receive an editioning view cover.

As shown, a run edition view 714 is a view that refers to SAMPLE_TABLE 712 and accesses only certain table columns (e.g., see the stippled column names of SAMPLE_TABLE 712). Also, a patch edition view 716 is a view that refers to SAMPLE_TABLE 712 and accesses only certain table columns (e.g., see the white column names of SAMPLE_TABLE 712).

Figure 8:
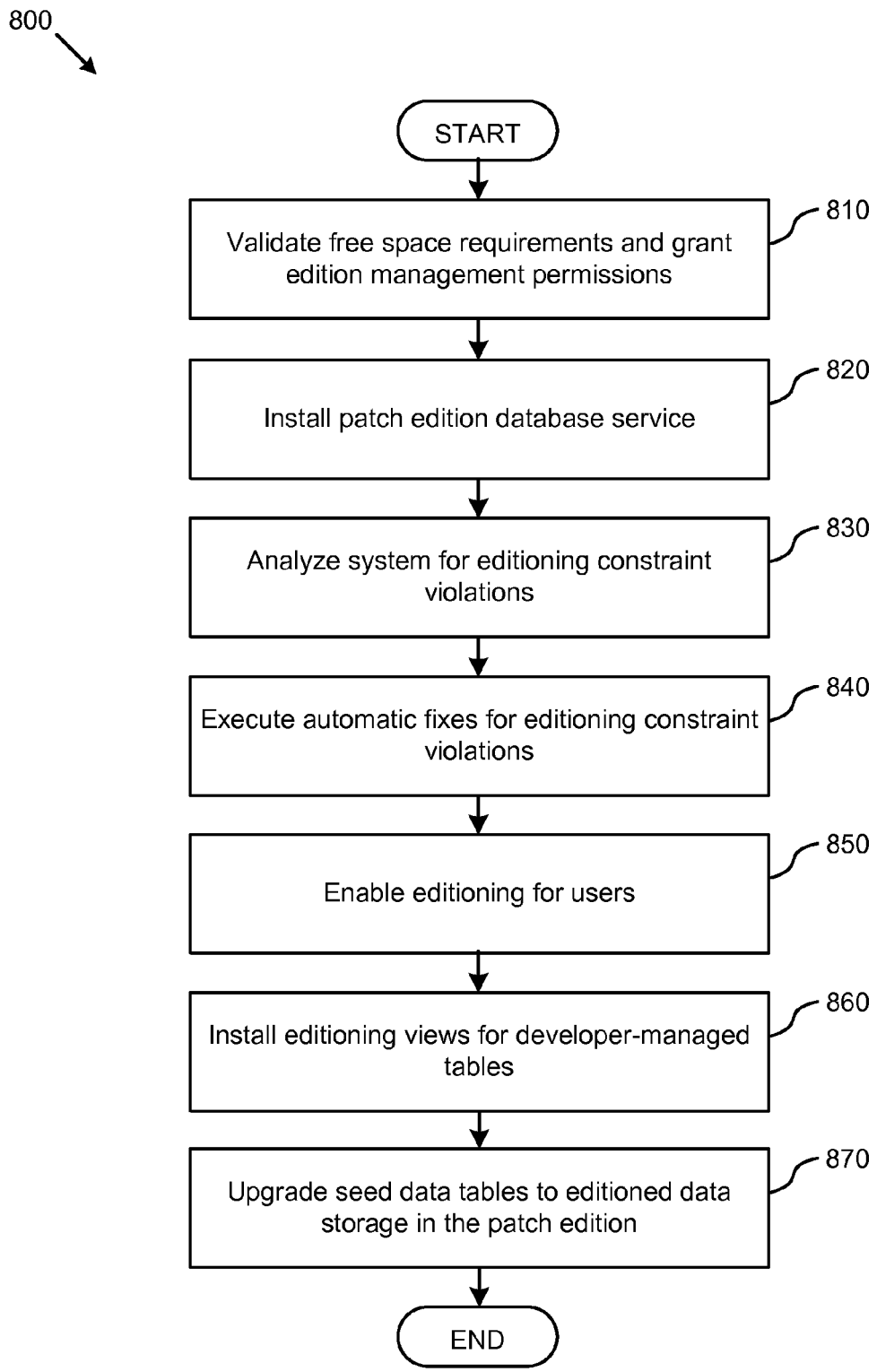
FIG. 8 is a flow chart of an editioning enablement process as used in reducing downtime during upgrades of interrelated components in a database system, according to some embodiments.

FIG. 8 is a flow chart of an editioning enablement process as used in reducing downtime during upgrades of interrelated components in a database system.

As shown, an editioning enablement process 800 performs all automatic fixes for editioning constraint violations, and then enables editioning. The online patching enablement as discussed here is implemented as a one-time upgrade operation that serves to enable editioning for a particular application such that any patches can be applied using the online patching techniques of the present disclosure.

Validate free space requirements and grant edition management permissions (see operation 810).
    Install patch edition database service (see operation 820).
    Analyze system for editioning constraint violations (see operation 830).
    Execute automatic fixes for editioning constraint violations (see operation 840).
    Enable editioning for users (see operation 850).
    Install editioning views for developer-managed tables (see operation 860).
    Upgrade seed data tables to editioned data storage in the patch edition (see operation 870).

Some of above online patching enablement steps are further described in the following paragraphs.

Validate Free Space Requirements

The performance of an online patching cycle will cause the system to create a new copy of any code or seed data that is modified by the patch. Obsolete copies of editioned objects will eventually be removed or deleted (e.g., in a clean-up operation), however in order to handle the maximum free space demands involved in online patching, enough free space is reserved to allow for full duplication of all code and seed data.

Install Database Patching Service

A database patching service allows connections to the database to be grouped for purposes of controlling workload and priority. Since patching operations can run in parallel with the running software application, the database patching service creates a database service to be used by all patching tools. This service will allow workload from patching operations to be controlled so as not to unduly impact the running software application.

Upgrade Seed Data Tables to Editioned Data Storage

The editioned data storage architecture allows a seed data table to hold multiple editions of application seed data in the same table. The seed data table upgrade serves to upgrade each seed data table to conform to the rules for forming and upgrading a patch edition.

Orchestration of the Online Patching Cycle

The orchestration of the online patching cycle includes actually applying the patches, and also involves system level operations to prepare, cutover, and cleanup application editions as follows:

PREPARE:
    Validate that the system is ready to start a new patching cycle.
        Run CLEANUP phase for previous patch session if needed.
        Check for available space and availability of needed services.
    Create new patch session.
    Submit an "online patch in progress" concurrent program; wait for it to start.
    Prepare database patch edition.
    Prepare file system patch edition (synchronize with run edition).

APPLY
    Merge multiple patches into a single merge patch if needed.
    Apply patch to patch edition.

FINALIZE
    Pre-compute cutover actions.
    Recompile invalid objects.
    Quiesce concurrent manager.
    Validate system is ready for cutover.
    Generate status report (e.g., what has changed in patch edition).
    Report any processing errors or invalid objects.

CUTOVER:
    Run FINALIZE phase for this patch session, if needed.
    Shutdown application services.
    Cutover to patch edition of database.
        Kill old database sessions (application use of the run edition is no longer allowed).
        Execute saved cutover actions.
        Promote patch edition to become new run edition.
        Retire old database edition (blocks new connections to it).
    Cutover to patch edition of file system.
        Configure patch file system as the new run file system.
        For multi-node, remote execute file system cutover on each slave node.
    Startup application services on new run edition.
        Execute a startup application services script on master node.
        For multi-node, remote execute startup application services script on each slave node.

CLEANUP:
    Cleanup old database edition.
        Drop cross-edition triggers.
        Drop covered objects.
        Drop unused columns and old editions.

Additional Embodiments of the Disclosure

Figure 9A:
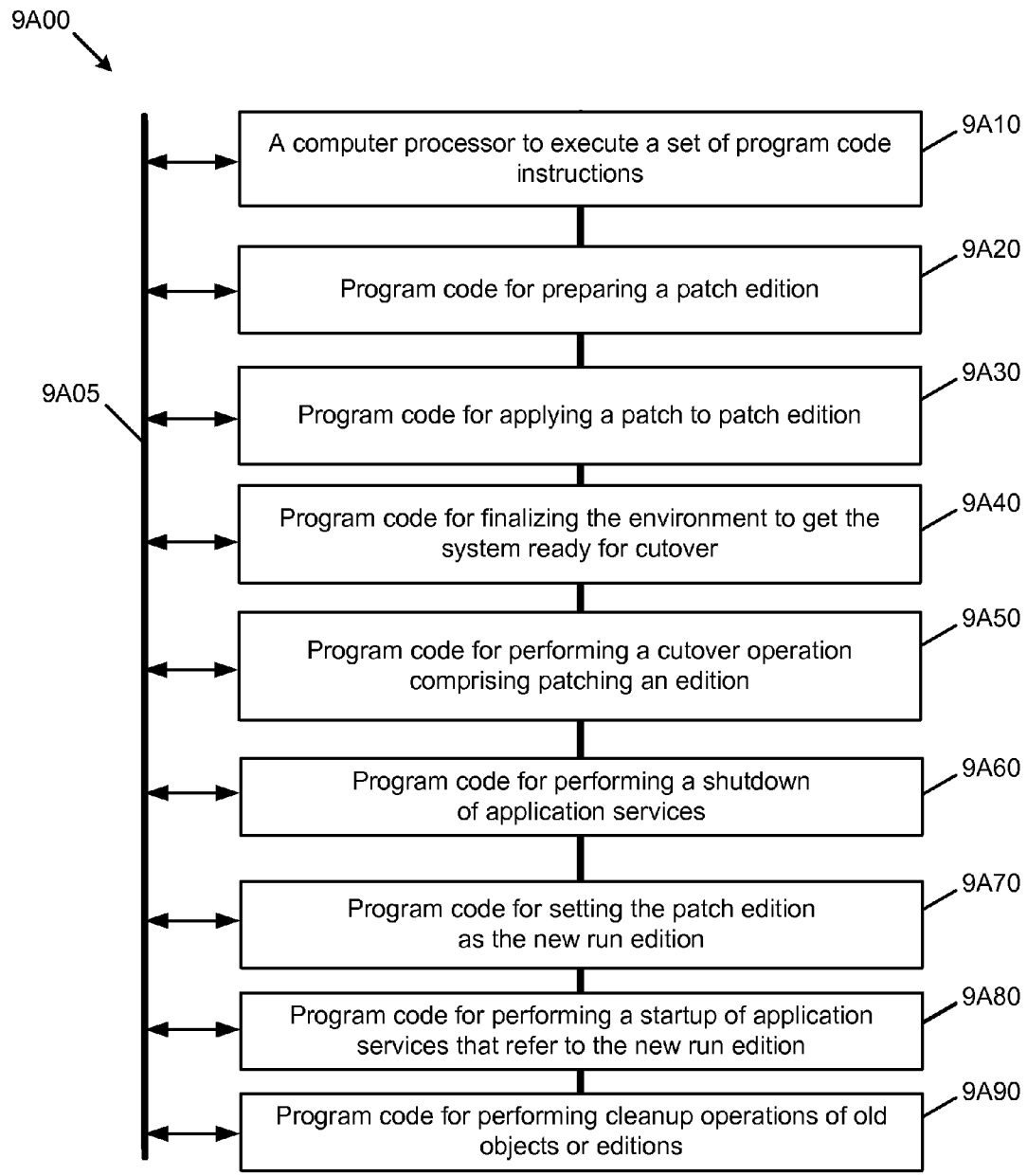
FIG. 9A depicts a block diagram of a system for reducing downtime during upgrades of interrelated components in a database system, according to some embodiments.

FIG. 9A depicts a block diagram of a system for reducing downtime during upgrades of interrelated components in a database system. As an option, the present system 9A00 may be implemented in the context of the architecture and functionality of the embodiments described herein. Of course, however, the system 9A00 or any operation therein may be carried out in any desired environment. As shown, system 9A00 comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with other operations over communication path 9A05. The modules of the system can, individually or in combination, perform method operations within system 9A00. Any operations performed within system 9A00 may be performed in any order unless as may be specified in the claims. The embodiment of FIG. 9A implements a portion of a computer system, shown as system 9A00, comprising a computer processor to execute a set of program code instructions (see module 9A10) and modules for accessing memory to hold program code instructions to perform: preparing a patch edition (see module 9A20); applying patch to patch edition (see module 9A30); finalizing the environment to get the system ready for cutover (see module 9A40); performing a cutover operation comprising patching an edition (see module 9A50); performing a shutdown of application services (see module 9A60); setting the patch edition as the new run edition (see module 9A70); performing a startup of application services (see module 9A80); and performing cleanup operations of old objects or old editions (see module 9A90).

Figure 9B:
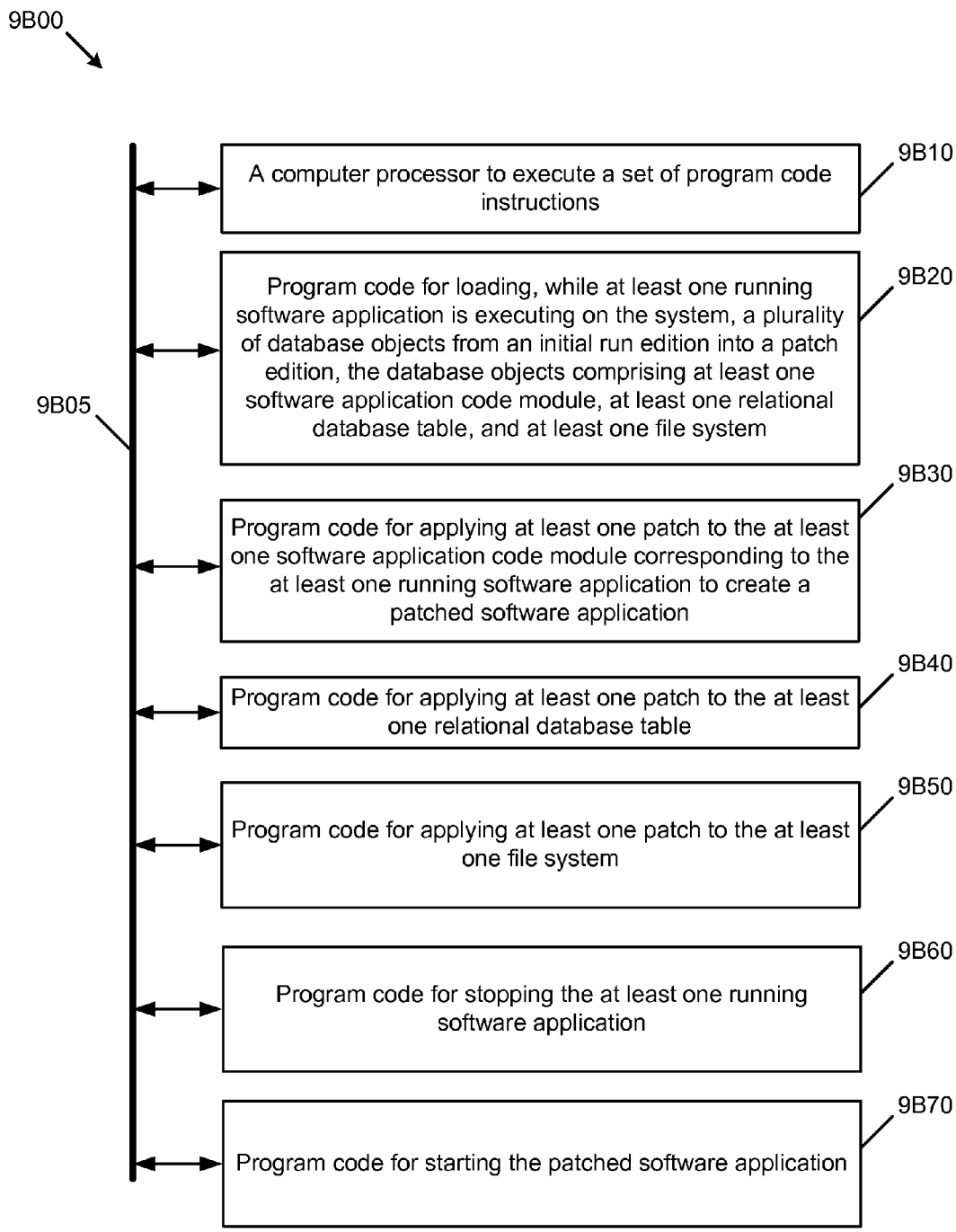
FIG. 9B depicts a block diagram of a system for reducing downtime during upgrades of interrelated components in a database system, according to some embodiments.

FIG. 9B depicts a block diagram of a system for reducing downtime during upgrades of interrelated components in a database system. As an option, the present system 9B00 may be implemented in the context of the architecture and functionality of the embodiments described herein. Of course, however, the system 9B00 or any operation therein may be carried out in any desired environment. As shown, system 9B00 comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with other operations over communication path 9B05. The modules of the system can, individually or in combination, perform method operations within system 9B00. Any operations performed within system 9B00 may be performed in any order unless as may be specified in the claims. The embodiment of FIG. 9B implements a portion of a computer system, shown as system 9B00, comprising a computer processor to execute a set of program code instructions (see module 9B10) and modules for accessing memory to hold program code instructions to perform: loading, while at least one running software application is executing on the system, a plurality of database objects from an initial run edition into a patch edition, the database objects comprising at least one software application code module, at least one relational database table, and at least one file system (see module 9B20); applying at least one patch to the at least one software application code module corresponding to the at least one running software application to create a patched software application (see module 9B30); applying at least one patch to the at least one relational database table (see module 9B40); applying at least one patch to the at least one file system (see module 9B50); stopping the at least one running software application (see module 9B60); and starting the patched software application (see module 9B70).

Figure 9C:
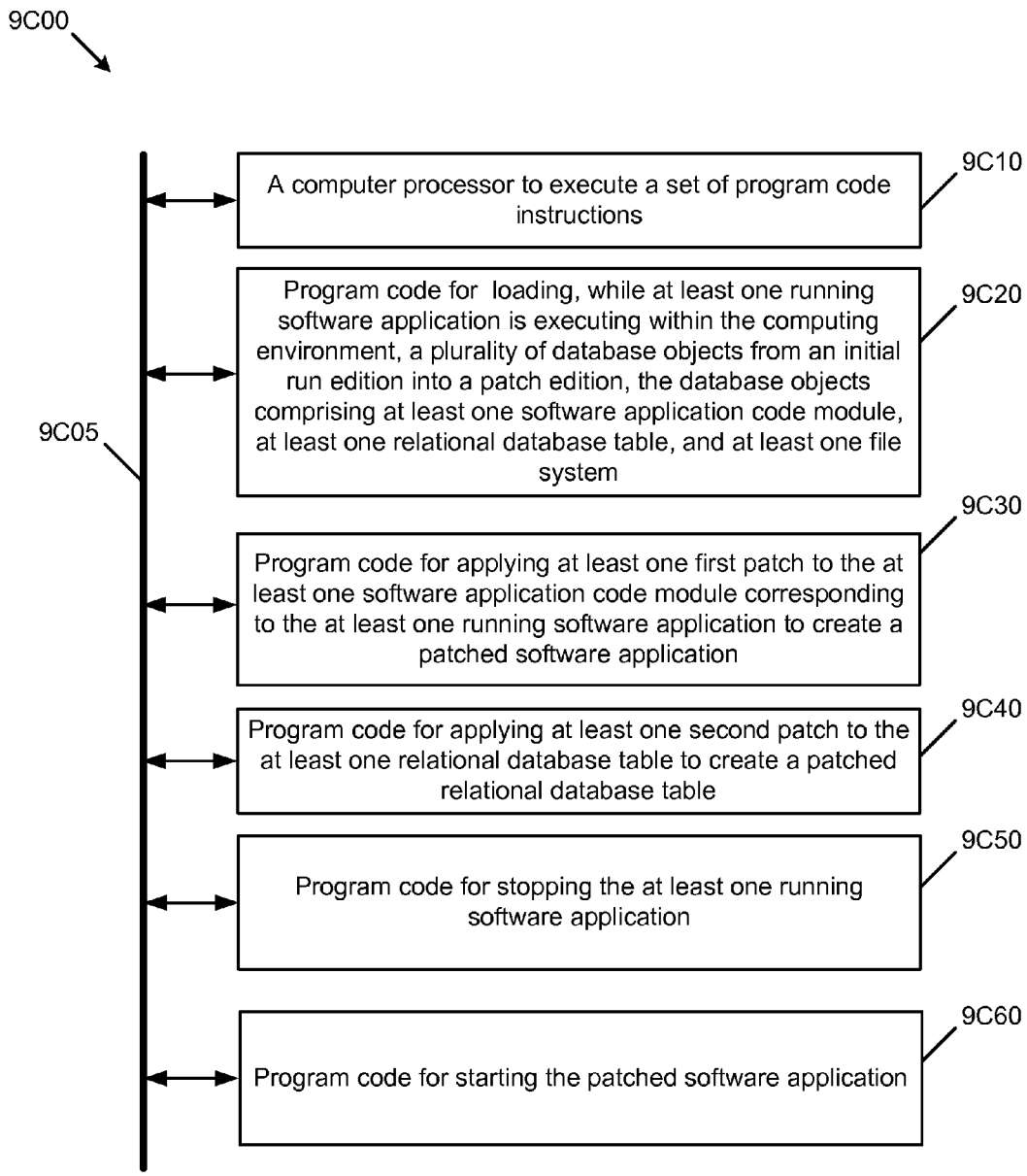
FIG. 9C depicts a block diagram of a system for reducing downtime during upgrades of interrelated components in a database system, according to some embodiments.

FIG. 9C depicts a block diagram of a system for reducing downtime during upgrades of interrelated components in a database system. As an option, the present system 9C00 may be implemented in the context of the architecture and functionality of the embodiments described herein. Of course, however, the system 9C00 or any operation therein may be carried out in any desired environment. As shown, system 9C00 comprises at least one processor and at least one memory, the memory serving to store program instructions corresponding to the operations of the system. As shown, an operation can be implemented in whole or in part using program instructions accessible by a module. The modules are connected to a communication path 9C05, and any operation can communicate with other operations over communication path 9C05. The modules of the system can, individually or in combination, perform method operations within system 9C00. Any operations performed within system 9C00 may be performed in any order unless as may be specified in the claims. The embodiment of FIG. 9C implements a portion of a computer system, shown as system 9C00, comprising a computer processor to execute a set of program code instructions (see module 9C10) and modules for accessing memory to hold program code instructions to perform: loading, while at least one running software application is executing within the computing environment, a plurality of database objects from an initial run edition into a patch edition, the database objects comprising at least one software application code module, at least one relational database table, and at least one file system (see module 9C20); applying at least one first patch to the at least one software application code module corresponding to the at least one running software application to create a patched software application (see module 9C30); applying at least one second patch to the at least one relational database table to create a patched relational database table (see module 9C40); stopping the at least one running software application (see module 9C50); and starting the patched software application (see module 9C60).

System Architecture Overview

Figure 10:
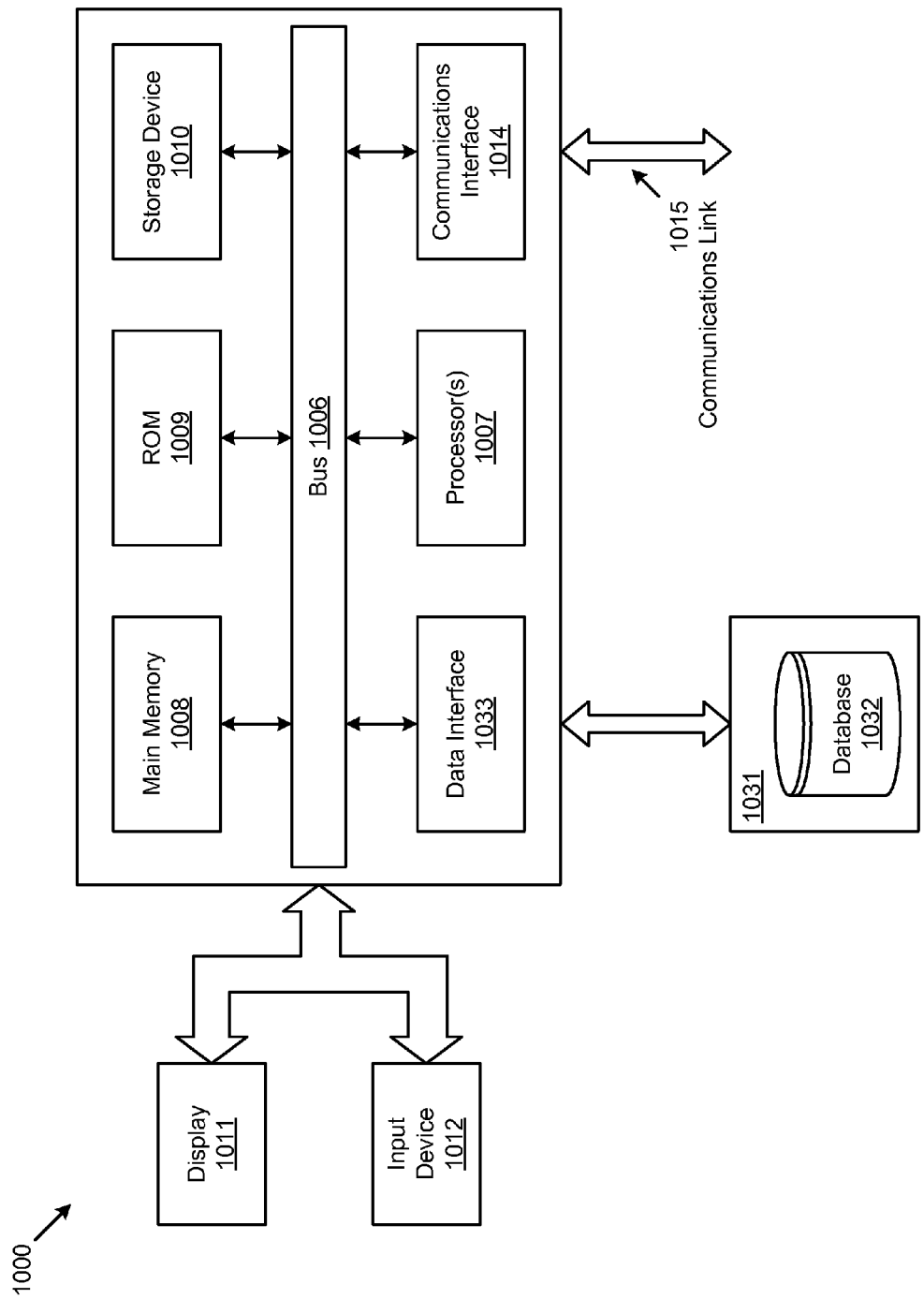
FIG. 10 depicts a block diagram of an instance of a computer system suitable for implementing an embodiment of the present disclosure.

FIG. 10 depicts a block diagram of an instance of a computing environment comprising a computer system 1000 suitable for implementing an embodiment of the present disclosure. Computer system 1000 includes a bus 1006 or other communication mechanism for communicating information, which interconnects subsystems and devices, such as a processor 1007, a system memory 1008 (e.g., RAM), a static storage device (e.g., ROM 1009), a disk drive 1010 (e.g., magnetic or optical), a data interface 1033, a communication interface 1014 (e.g., modem or Ethernet card), a display 1011 (e.g., CRT or LCD), input devices 1012 (e.g., keyboard, cursor control), and an external data repository 1031.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1000. According to certain embodiments of the disclosure, two or more computer systems 1000 coupled by a communications link 1015 (e.g., LAN, PTSN, or wireless network) may perform the sequence of instructions required to practice the disclosure in coordination with one another.

Computer system 1000 may transmit and receive messages, data, and instructions, including programs (e.g., application code modules), through communications link 1015 and communication interface 1014. Received program code may be executed by processor 1007 as it is received, and/or stored in disk drive 1010 or other non-volatile storage for later execution. Computer system 1000 may communicate through a data interface 1033 to a database 1032 on an external data repository 1031. A module as used herein can be implemented using any mix of any portions of the system memory 1008, and any extent of hard-wired circuitry including hard-wired circuitry embodied as a processor 1007.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for reducing downtime during upgrades of interrelated components in a computing environment, the method comprising:
    identifying an initial run edition associated with at least one running software application;
    identifying an interrelation between the at least one running software application and at least one relational database table using at least one or more synonyms indicative of the interrelation;
    identifying a plurality of components from the initial run edition based in part or in whole upon the interrelation, the plurality of components comprising at least one software application code module for the at least one running software applications, at least a portion of the at least one relational database table, and at least one file system;
    loading the plurality of components into a patch edition;
    applying at least one first patch to the at least one software application code module in the patch edition corresponding to the at least one running software application to create a patched software application;
    applying at least one second patch to the at least one relational database table in the patch edition to create a patched relational database table;
    after the at least one first patch and the at least one second patch have been applied, shutting down the initial run edition associated with the at least one running software application;
    starting the patch edition corresponding to the at least one running software application after shutting down the initial run edition such that one or more users accessing the initial run edition associated with the at least one running software application are placed offline during a cutover period and return online after conclusion of the cutover period;
    identifying one or more instances of a running file system for the at least one running software application;
    identifying a running file system format for the one or more instances of the running file system;
    identifying running file system content for the one or more instances of the running file system, the running file system content including an application definition and application metadata that control how the at least one running software application operates;
    associating the one or more instances of the running file system with an initial run file system edition;
    amalgamating the initial run file system edition into the initial run edition that is associated with the at least one running software application;
    creating a file system patch edition for the one or more instances of the running file system;
    synchronizing the file system patch edition with the initial run file system edition; and
    creating a patch or upgrade session for the one or more instances of the running file system.

2. The method of claim 1, further comprising modifying a synonym to refer to a logical schema of the patch edition.

3. The method of claim 1, further comprising applying at least one file system patch to the at least one file system to create a patch file system.

4. The method of claim 3, further comprising configuring the patch file system as a new run file system.

5. The method of claim 1, further comprising deleting the at least one software application code module that was used to create the patched software application.

6. The method of claim 1, further comprising at least one of, calculating free space requirements, granting edition management permissions, executing one or more finalizing steps, the finalizing steps comprising at least one of, computing cutover actions, recompiling selected objects, or reporting processing errors, or enabling editioning for users.

7. The method of claim 1, further comprising:
    validating that the one or more instances of the running file system are ready to start the patch or upgrade session at least by cleaning up one or more previous patch sessions and by checking for availability of one or more services needed for the patch or upgrade cycle;
    determining a patch file system format and patch file system content for the file system patch edition;
    preparing the file system patch edition for the one or more instances of the running file system at least by modifying the running file system into a patch file system, modifying the running file system comprising at least applying the patch system format and the patch file system content to the file system patch edition;
    determining one or more cutover actions for the cutover period;
    re-compiling one or more invalid objects;
    quiescing a concurrent manager; and
    configuring the patch file system as a new running file system.

8. The method of claim 1, further comprising:
    synchronizing at least a portion of the initial run edition and the patch edition at least by populating one or more changes between the initial run edition and the patch edition.

9. The computer implemented method of claim 1, further comprising:

identifying one or more non-editioned objects in the initial run edition;
identifying at least one session context for the one or more non-editioned objects in the initial run edition;
referencing the one or more non-editioned objects with only one or more corresponding editioned synonyms based in part or in whole upon the at least one session context;
identifying one or more editioned objects in the initial run edition;
identifying at least one change made to the one or more editioned objects in the initial run edition;
populating the at least one change to the patch edition;
identifying metadata that are interrelated to the at least one running software application from the initial run edition;
copying the metadata from the initial run edition to the patch edition;
loading the plurality of components into the patch edition at least by copying the at least one software application code module to the patch edition and by referencing the at least one relational database table in the patch edition;
preparing the file system patch edition for the at least one in the patch edition;
discarding one or more first synonyms for one or more first objects;
replacing reference to the one or more first synonyms with one or more private synonyms; and
performing a cutover from the initial run edition to the patch edition at least by modifying a first synonym referring to a logical schema of the initial run edition into a first modified synonym and by referencing the logical schema of the patch edition.

10. A computer system for reducing downtime during upgrades of interrelated components in a computing environment, comprising:
a computer processor to execute a set of program code instructions; and
a memory to hold the program code instructions, in which the program code instructions comprises program code which, when executed by the computer processor, causes the computer processor at least to:
identify an initial run edition associated with at least one running software application;
identify an interrelation between the at least one running software application and at least one relational database table using at least one or more synonyms indicative of the interrelation;
identify a plurality of components from the initial run edition based in part or in whole upon the interrelation, the plurality of components comprising at least one software application code module for the at least one running software applications, at least a portion of the at least one relational database table, and at least one file system;
load the plurality of components into a patch edition;
apply at least one first patch to the at least one software application code module in the patch edition corresponding to the at least one running software application to create a patched software application;
apply at least one second patch to the at least one relational database table in the patch edition to create a patched relational database table;
after the at least one first patch and the at least one second patch have been applied, shut down the initial run edition associated with the at least one running software application;
start the patch edition corresponding to the at least one running software application after shutting down the initial run edition such that one or more users accessing the initial run edition associated with the at least one running software application are placed offline during a cutover period and return online after conclusion of the cutover period;
identify one or more instances of a running file system for the at least one running software application;
identify a running file system format for the one or more instances of the running file system;
identify running file system content for the one or more instances of the running file system, the running file system content including an application definition and application metadata that control how the at least one running software application operates;
associate the one or more instances of the running file system with an initial run file system edition;
amalgamate the initial run file system edition into the initial run edition that is associated with the at least one running software application;
create a file system patch edition for the one or more instances of the running file system;
synchronize the file system patch edition with the initial run file system edition; and
create a patch or upgrade session for the one or more instances of the running file system.

11. The computer system of claim 10, further comprising program code which, when executed by the computer processor, further causes the computer processor to modify a synonym to refer to a logical schema of the patch edition.

12. The computer system of claim 10, further comprising program code which, when executed by the computer processor, further causes the computer processor to apply at least one file system patch to the at least one file system to create a patch file system.

13. The computer system of claim 12, further comprising program code which, when executed by the computer processor, further causes the computer processor to configure the patch file system as a new run file system.

14. The computer system of claim 10, further comprising program code which, when executed by the computer processor, further causes the computer processor to delete the at least one software application code module that was used to create the patched software application.

15. The computer system of claim 10, further comprising program code which, when executed by the computer processor, further causes the computer processor to access the patched relational database table using the patched software application.

16. A computer program product embodied in a non-transitory computer readable medium, the computer readable medium having stored thereon a sequence of instructions which, when executed by a processor causes the processor to execute a set of tasks to implement reducing downtime during upgrades of interrelated components in a computing environment, the set of tasks comprising:
identifying an initial run edition associated with at least one running software application;
identifying an interrelation between the at least one running software application and at least one relational database table using at least one or more synonyms indicative of the interrelation;

identifying a plurality of components from the initial run edition based in part or in whole upon the interrelation, the plurality of components comprising at least one software application code module for the at least one running software applications, at least a portion of the at least one relational database table, and at least one file system;

loading the plurality of components into a patch edition;

applying at least one first patch to the at least one software application code module in the patch edition corresponding to the at least one running software application to create a patched software application;

applying at least one second patch to the at least one relational database table in the patch edition to create a patched relational database table;

after the at least one first patch and the at least one second patch have been applied, shutting down the initial run edition associated with the at least one running software application;

starting the patch edition corresponding to the at least one running software application after shutting down the initial run edition such that one or more users accessing the initial run edition associated with the at least one running software application are placed offline during a cutover period and return online after conclusion of the cutover period;

identifying one or more instances of a running file system for the at least one running software application;

identifying a running file system format for the one or more instances of the running file system;

identifying running file system content for the one or more instances of the running file system, the running file system content including an application definition and application metadata that control how the at least one running software application operates;

associating the one or more instances of the running file system with an initial run file system edition;

amalgamating the initial run file system edition into the initial run edition that is associated with the at least one running software application;

creating a file system patch edition for the one or more instances of the running file system;

synchronizing the file system patch edition with the initial run file system edition; and creating a patch or upgrade session for the one or more instances of the running file system.

17. The computer program product of claim 16, further comprising instructions for modifying a synonym to refer to a logical schema of the patch edition.

18. The computer program product of claim 16, further comprising instructions for applying at least one file system patch to the at least one file system to create a patch file system.

19. The computer program product of claim 18, further comprising instructions for configuring the patch file system as a new run file system.

20. The computer program product of claim 16, further comprising instructions for deleting the at least one software application code module that was used to create the patched software application.

\* \* \* \* \*

UNITED STATES PATENT AND TRADEMARK OFFICE
CERTIFICATE OF CORRECTION

PATENT NO. : 9,448,784 B2
APPLICATION NO. : 13/802791
DATED : September 20, 2016
INVENTOR(S) : Buzaski et al.

Page 1 of 1

It is certified that error appears in the above-identified patent and that said Letters Patent is hereby corrected as shown below:

On the Title Page

On page 2, Column 2, under Other Publication, Line 31, delete "Schcma" and insert -- Schema --, therefor.

On page 2, Column 2, under Other Publication, Line 33, delete "Cororation." and insert -- Corporation. --, therefor.

In the Specification

In Column 1, Line 37, after "which is" insert -- hereby --.

In Column 12, Lines 33-37, delete "Editioning View in the Patch Edition so that it picks up the new columns. The new columns are now visible to the patch edition of the application, but empty of data." and insert the same on Column 2, Line 34, as the continuation of one paragraph.

In Column 17, Line 9, delete "PTSN," and insert -- PSTN, --, therefor.

Signed and Sealed this
Second Day of October, 2018

Andrei Iancu
*Director of the United States Patent and Trademark Office*